(12) United States Patent
Patel et al.

(10) Patent No.: US 11,034,377 B2
(45) Date of Patent: Jun. 15, 2021

(54) SYSTEM AND METHOD OF AUTOMATICALLY STOWING AND UNSTOWING A STEERING COLUMN ASSEMBLY

(71) Applicant: STEERING SOLUTIONS IP HOLDING CORPORATION, Saginaw, MI (US)

(72) Inventors: Keyur R. Patel, Saginaw, MI (US); Edward A. Cana, Grand Blanc, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 171 days.

(21) Appl. No.: 16/050,777

(22) Filed: Jul. 31, 2018

(65) Prior Publication Data
US 2020/0039562 A1  Feb. 6, 2020

(51) Int. Cl.
*B62D 1/183* (2006.01)
*B62D 1/181* (2006.01)

(52) U.S. Cl.
CPC .............. *B62D 1/183* (2013.01); *B62D 1/181* (2013.01)

(58) Field of Classification Search
CPC ........ B62D 1/181; B62D 1/183; B62D 1/184; B62D 1/185
See application file for complete search history.

(56) References Cited

U.S. PATENT DOCUMENTS

| | | | | |
|---|---|---|---|---|
| 2,845,315 | A | * | 7/1958 | McCoy ................... B60N 3/002 108/33 |
| 2,862,328 | A | * | 12/1958 | Wadsworth ........ B64D 11/0638 108/44 |
| 3,396,600 | A | * | 8/1968 | Zeigler ................... B62D 1/183 74/493 |
| 3,548,675 | A | * | 12/1970 | Grimes ................... B62D 1/183 74/493 |
| 4,503,504 | A | * | 3/1985 | Suzumura ................. B60R 1/07 280/775 |
| 4,530,254 | A | * | 7/1985 | Toyoda ................... B62D 1/183 74/493 |
| 4,537,089 | A | * | 8/1985 | Moneta .................... B62D 1/18 280/775 |
| 4,648,624 | A | * | 3/1987 | Mouhot ................... F16B 2/185 280/775 |
| 4,722,241 | A | * | 2/1988 | Yoshida ................. B62D 1/183 74/493 |

(Continued)

FOREIGN PATENT DOCUMENTS

DE   102017128739 A1   6/2018

OTHER PUBLICATIONS

English translation of Office Action regarding related DE App. No. 102019120543.3, dated Jul. 17, 2020.

*Primary Examiner* — Paul N Dickson
*Assistant Examiner* — Timothy Wilhelm
(74) *Attorney, Agent, or Firm* — Dickinson Wright PLLC

(57) ABSTRACT

A retractable steering column assembly includes a retractable portion. The assembly also includes an electric actuator mechanism for translating and tilting the retractable portion throughout a plurality of regions, each of the regions defining distinct manual adjustment restrictions and tilt position boundaries of the retractable steering column assembly.

10 Claims, 3 Drawing Sheets

(56) References Cited

U.S. PATENT DOCUMENTS

| | | | | |
|---|---|---|---|---|
| 4,753,121 A * | 6/1988 | Venable | B62D 1/184 | 280/775 |
| 4,900,059 A * | 2/1990 | Kinoshita | B62D 1/181 | 280/775 |
| 4,958,852 A * | 9/1990 | Kohno | B62D 1/183 | 280/775 |
| 5,035,446 A * | 7/1991 | Arvidsson | B62D 1/181 | 280/775 |
| 5,164,645 A * | 11/1992 | Furuse | B60N 2/0232 | 318/467 |
| 5,178,411 A * | 1/1993 | Fevre | B62D 1/181 | 280/775 |
| RE34,359 E | 8/1993 | Matsumoto | B62D 1/181 | 280/775 |
| 5,439,252 A * | 8/1995 | Oxley | B62D 1/184 | 280/775 |
| 5,542,360 A * | 8/1996 | Fleming | A47B 23/04 | 108/23 |
| 5,560,676 A * | 10/1996 | Griffith | B60N 3/001 | 108/44 |
| 5,820,194 A * | 10/1998 | Slayter | B60N 3/001 | 296/70 |
| 5,915,776 A * | 6/1999 | Bieri | B60R 7/10 | 296/37.12 |
| 5,924,515 A * | 7/1999 | Stauffer | B60N 2/38 | 180/326 |
| 6,135,546 A * | 10/2000 | Demtchouk | B60N 3/002 | 108/44 |
| 6,167,777 B1 * | 1/2001 | Snell | B62D 1/184 | 280/775 |
| 6,189,405 B1 * | 2/2001 | Yazane | B62D 1/184 | 180/444 |
| 6,241,284 B1 * | 6/2001 | De Verdier | B62D 1/195 | 280/777 |
| 6,360,149 B1 * | 3/2002 | Kwon | B60K 35/00 | 701/41 |
| 6,382,745 B1 * | 5/2002 | Adkins | B60N 3/002 | 108/97 |
| 6,390,505 B1 * | 5/2002 | Wilson | B62D 1/181 | 280/775 |
| 6,460,427 B1 * | 10/2002 | Hedderly | B62D 1/184 | 280/775 |
| 6,543,807 B2 * | 4/2003 | Fujiu | B62D 1/184 | 280/775 |
| 6,688,644 B2 * | 2/2004 | Tsunoda | B62D 1/184 | 280/775 |
| 6,692,051 B1 * | 2/2004 | Cook | B60N 2/062 | 296/190.01 |
| 6,711,965 B2 * | 3/2004 | Tomaru | B62D 1/181 | 280/775 |
| 6,820,895 B2 * | 11/2004 | Levine | B60K 23/02 | 280/735 |
| 6,857,498 B2 * | 2/2005 | Vitale | B60K 37/00 | 180/326 |
| 6,902,192 B2 * | 6/2005 | Sato | B62D 1/184 | 280/775 |
| 6,964,432 B2 * | 11/2005 | Morita | B62D 1/184 | 280/775 |
| 7,097,082 B2 * | 8/2006 | Wallaker | B60R 11/02 | 224/483 |
| 7,178,422 B2 * | 2/2007 | Armstrong | B62D 1/184 | 280/775 |
| 7,213,673 B2 * | 5/2007 | Shabana | G05G 1/405 | 180/334 |
| 7,293,507 B2 * | 11/2007 | DePue | B60N 3/002 | 108/152 |
| 7,303,226 B2 * | 12/2007 | Bernstein | B60N 2/14 | 296/190.01 |
| 7,331,608 B2 * | 2/2008 | Armstrong | B62D 1/181 | 280/775 |
| 7,354,069 B2 * | 4/2008 | Yamada | B62D 1/184 | 280/775 |
| 7,363,131 B2 * | 4/2008 | Howell | B62D 1/18 | 701/41 |
| 7,422,238 B2 * | 9/2008 | Li | B62D 1/184 | 280/775 |
| 7,469,616 B2 * | 12/2008 | Fujiu | B62D 1/184 | 74/493 |
| 7,474,204 B2 * | 1/2009 | Songwe, Jr. | B60K 35/00 | 340/461 |
| 7,494,170 B2 * | 2/2009 | Hanzel | B60R 11/00 | 296/37.12 |
| 7,637,360 B2 * | 12/2009 | Carlson | A47C 1/03 | 188/267.2 |
| 7,641,252 B2 * | 1/2010 | Sturt | B60N 3/002 | 296/24.34 |
| 7,665,767 B2 * | 2/2010 | Olgren | B62D 1/184 | 280/775 |
| 7,770,487 B2 * | 8/2010 | Kumar | B62D 1/184 | 280/775 |
| 7,946,542 B1 * | 5/2011 | Chapman | B60R 11/0252 | 248/122.1 |
| 7,954,852 B2 * | 6/2011 | Ueno | B62D 1/16 | 280/775 |
| 8,056,437 B2 * | 11/2011 | Rouleau | B62D 1/187 | 74/493 |
| 8,109,565 B2 * | 2/2012 | Waters | B60N 2/206 | 108/44 |
| 8,237,389 B2 * | 8/2012 | Fitch | B25J 13/06 | 180/271 |
| 8,256,322 B2 * | 9/2012 | Takezawa | B62D 1/189 | 280/775 |
| 8,342,450 B2 * | 1/2013 | Funke | B64D 11/06 | 244/118.6 |
| 8,601,901 B2 * | 12/2013 | Ishii | B62D 1/184 | 280/775 |
| 8,714,093 B2 * | 5/2014 | Rigner | B60R 7/06 | 108/45 |
| 8,720,299 B2 * | 5/2014 | Nakamura | B62D 1/187 | 280/775 |
| 8,746,740 B2 * | 6/2014 | Tanaka | B62D 1/184 | 280/777 |
| 8,863,610 B2 * | 10/2014 | Krauter | B62D 1/183 | 280/775 |
| 8,899,623 B2 * | 12/2014 | Stadler | B62D 1/197 | 280/777 |
| 8,967,017 B2 * | 3/2015 | Osawa | B62D 1/184 | 280/775 |
| 9,007,318 B2 * | 4/2015 | Goldman-Shenhar | G06F 3/0488 | 345/173 |
| 9,039,042 B2 * | 5/2015 | Moriyama | B62D 1/189 | 280/775 |
| 9,145,161 B2 * | 9/2015 | Nagasawa | B22D 19/045 | |
| 9,150,164 B2 * | 10/2015 | Mitchell | B60R 11/0235 | |
| 9,187,011 B2 * | 11/2015 | Rouxel | B60N 3/002 | |
| 9,194,168 B1 * | 11/2015 | Lu | B60R 25/24 | |
| 9,248,743 B2 * | 2/2016 | Enthaler | B60K 37/06 | |
| 9,428,118 B1 * | 8/2016 | Rawlinson | B60N 3/001 | |
| 9,469,196 B2 * | 10/2016 | Kim | B62D 1/02 | |
| 9,505,383 B2 * | 11/2016 | Peel | B60T 7/16 | |
| 9,550,513 B2 * | 1/2017 | Fujiwara | B62D 1/195 | |
| 9,623,897 B2 * | 4/2017 | Myohoji | B62D 1/195 | |
| 9,637,160 B2 * | 5/2017 | Okano | B62D 1/184 | |
| 9,663,134 B2 * | 5/2017 | Imagaki | B62D 1/184 | |
| 9,688,146 B2 * | 6/2017 | Kim | B60K 35/00 | |
| 9,758,064 B1 * | 9/2017 | Dry | B60N 3/002 | |
| 9,764,756 B2 * | 9/2017 | Sugioka | B62D 1/183 | |
| 9,802,638 B1 * | 10/2017 | Stoffel | B62D 1/00 | |
| 9,828,016 B2 * | 11/2017 | Lubischer | B60R 21/203 | |
| 9,840,271 B2 * | 12/2017 | Rouleau | B62D 1/181 | |
| 9,855,860 B2 * | 1/2018 | Ahn | B60N 3/06 | |
| 9,862,327 B2 * | 1/2018 | Huebner | B60R 7/06 | |
| 9,862,403 B1 * | 1/2018 | Rouleau | B62D 1/181 | |
| 9,868,458 B1 * | 1/2018 | Ravindra | B62D 1/195 | |
| 9,896,011 B2 * | 2/2018 | Kong | B60N 3/002 | |
| 9,925,903 B2 * | 3/2018 | Christiansson | B60N 3/001 | |
| 9,960,800 B2 * | 5/2018 | An | H04B 1/3822 | |
| 9,963,035 B2 * | 5/2018 | El Aile | B60R 21/203 | |

(56) References Cited

U.S. PATENT DOCUMENTS

| | | | |
|---|---|---|---|
| 10,017,087 B2* | 7/2018 | Dry | E05D 11/00 |
| 10,023,091 B2* | 7/2018 | Bendewald | B60N 3/001 |
| 10,023,124 B2* | 7/2018 | Schmidt | B60K 26/02 |
| 10,065,671 B2* | 9/2018 | Sugishita | B62D 1/185 |
| 10,086,732 B2* | 10/2018 | Welch | B60N 2/757 |
| 10,093,339 B2* | 10/2018 | Bodtker | B62D 1/184 |
| 10,112,640 B2* | 10/2018 | Bodtker | B62D 1/184 |
| 10,146,357 B2* | 12/2018 | Bendewald | B60W 50/14 |
| 10,300,825 B2* | 5/2019 | Akaike | B60N 3/002 |
| 10,343,555 B2* | 7/2019 | Tan | B60N 2/06 |
| 10,421,476 B2* | 9/2019 | Rouleau | B62D 1/181 |
| 10,457,314 B2* | 10/2019 | Swamidason | B62D 5/005 |
| 10,479,393 B2* | 11/2019 | Sakayanagi | B62D 1/181 |
| 10,577,012 B2* | 3/2020 | Dekker | B62D 1/04 |
| 2002/0066392 A1* | 6/2002 | Calam | B60R 11/0252 108/33 |
| 2002/0158448 A1* | 10/2002 | Okonkwo | B60K 37/00 280/728.2 |
| 2003/0094063 A1* | 5/2003 | Cooper | B62D 1/184 74/493 |
| 2005/0018392 A1* | 1/2005 | Strohmeier | B60R 11/0205 361/679.55 |
| 2005/0081674 A1* | 4/2005 | Nishioka | B62D 1/184 74/493 |
| 2005/0218681 A1* | 10/2005 | DePue | B60N 3/002 296/37.12 |
| 2006/0028010 A1* | 2/2006 | Yamada | B62D 1/184 280/775 |
| 2006/0197353 A1* | 9/2006 | Hanzel | B60R 11/00 296/37.12 |
| 2008/0238068 A1* | 10/2008 | Kumar | B62D 1/183 280/775 |
| 2009/0085368 A1* | 4/2009 | Coffelt | B60K 35/00 296/70 |
| 2011/0156478 A1* | 6/2011 | Thorsell | B60K 37/04 307/9.1 |
| 2012/0049558 A1* | 3/2012 | Souillac | B60R 11/00 296/37.12 |
| 2013/0174686 A1 | 7/2013 | Hirche et al. | |
| 2013/0185662 A1* | 7/2013 | Quattrocolo | B60K 37/06 715/764 |
| 2013/0233117 A1* | 9/2013 | Read | B62D 1/181 74/493 |
| 2014/0252811 A1* | 9/2014 | Whalen | B60N 3/002 297/144 |
| 2015/0343963 A1* | 12/2015 | Angeletti | B60R 11/0241 296/37.12 |
| 2015/0375769 A1* | 12/2015 | Abboud | B62D 1/181 74/493 |
| 2016/0121805 A1* | 5/2016 | Forsgren | B60R 11/0235 348/837 |
| 2016/0266778 A1* | 9/2016 | Rawlinson | B60K 35/00 |
| 2016/0347348 A1* | 12/2016 | Lubischer | B62D 1/181 |
| 2016/0362126 A1* | 12/2016 | Lubischer | B62D 1/183 |
| 2016/0375924 A1* | 12/2016 | Bodtker | B62D 1/046 74/552 |
| 2016/0375926 A1* | 12/2016 | Lubischer | B62D 1/183 74/493 |
| 2016/0375927 A1* | 12/2016 | Schulz | B62D 1/183 280/775 |
| 2016/0375929 A1* | 12/2016 | Rouleau | B62D 1/181 74/493 |
| 2017/0112274 A1* | 4/2017 | De Saulles | A47B 13/16 |
| 2017/0151975 A1* | 6/2017 | Schmidt | B62D 1/181 |
| 2017/0212633 A1* | 7/2017 | You | B60K 37/06 |
| 2017/0293306 A1* | 10/2017 | Riefe | G05D 1/0044 |
| 2017/0297606 A1* | 10/2017 | Kim | B62D 1/183 |
| 2017/0334452 A1* | 11/2017 | Abe | B60W 50/082 |
| 2017/0361863 A1* | 12/2017 | Rouleau | B62D 1/185 |
| 2018/0079426 A1* | 3/2018 | Salter | G05D 1/0088 |
| 2018/0154932 A1* | 6/2018 | Rakouth | B62D 15/025 |
| 2018/0251147 A1* | 9/2018 | Heitz | B62D 1/181 |
| 2018/0272900 A1* | 9/2018 | Fitzpatrick | B60N 3/001 |
| 2019/0016365 A1* | 1/2019 | Swamidason | B62D 5/006 |
| 2019/0077438 A1* | 3/2019 | Collier | B62D 1/16 |

* cited by examiner

SYSTEM AND METHOD OF AUTOMATICALLY STOWING AND UNSTOWING A STEERING COLUMN ASSEMBLY

BACKGROUND OF THE INVENTION

The embodiments described herein relate to retracting steering column assemblies and, more particularly, to a system and method of automatically stowing and/or unstowing a steering column assembly.

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle. For example, a steering wheel may be retracted to a stowed position to enlarge the space available for a driver.

An automated, electromechanical system is often relied upon to translate the steering column between an extended position and a retracted position. Currently, such systems use an analog switch to achieve a specific position, which does not include automatic stow and/or unstow features. Driver intervention is required to stow or unstow the steering column.

SUMMARY OF THE INVENTION

According to an embodiment of the disclosure, a retractable steering column assembly includes a retractable portion. The assembly also includes an electric actuator mechanism for translating and tilting the retractable portion throughout a plurality of regions, each of the regions defining distinct manual adjustment restrictions and tilt position boundaries of the retractable steering column assembly.

According to another embodiment of the disclosure, a method of controlling adjustment of a steering column assembly is provided. The method includes detecting a telescope position of the steering column assembly. The method also includes determining which one of a plurality of regions the telescope position is within. The method further includes defining a manual adjustment restriction based on which of the plurality of regions the telescope position is within.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
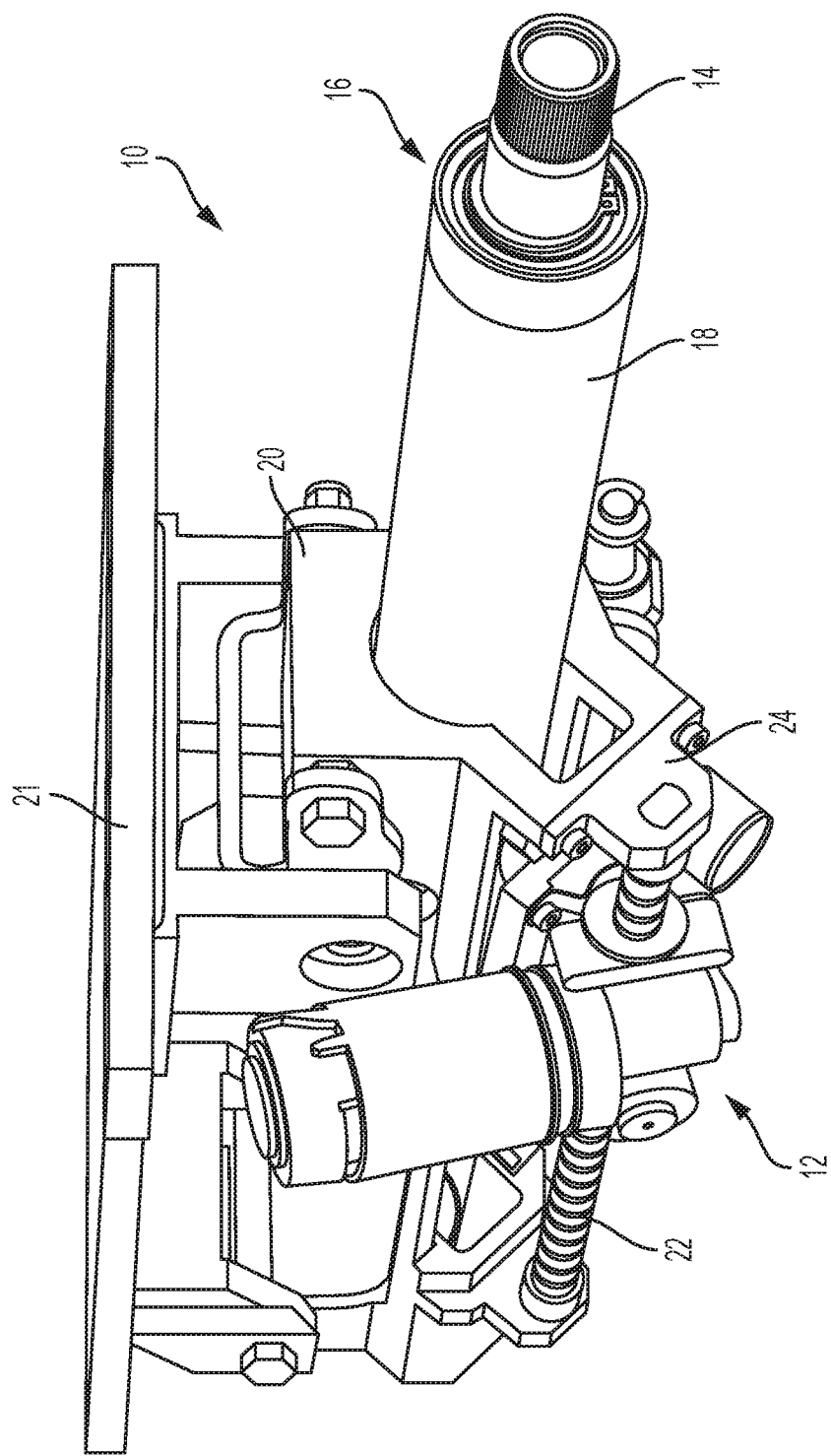
FIG. 1 is a perspective view of a steering column assembly.

Referring now to the Figures, where the invention will be described with reference to specific embodiments, without limiting same, FIG. 1 illustrates a steering column assembly 10. The steering column assembly 10 facilitates translation of a steering wheel (not shown) and a steering shaft 14 in a retractable manner. This is particularly beneficial in embodiments where the assembly 10 is employed in a passenger vehicle equipped with Advanced Driver Assist System(s) (ADAS) to allow the vehicle to be autonomously, or semi-autonomously, controlled using sensing, steering, and/or braking technology. When the ADAS is activated, the steering wheel is not required for vehicle control in some situations. Retraction of the steering wheel and steering shaft 14 toward, and possibly into, the instrument cluster greatly enhances user comfort by providing a driver with more space. The additional space provided facilitates additional workspace area or leg room, for example.

The embodiments described herein provide a retractable steering column which allows the steering wheel to be retracted while the vehicle is in an autonomous, or semi-autonomous, driving mode, and methods associated with monitoring and adjusting the steering column assembly 10. The operating conditions described herein for the steering wheel are standard driving mode, autonomous driving mode, and a transition mode therebetween.

In the standard driving mode, the steering column assembly 10 is extended to a location that disposes the steering wheel in a position that is comfortably reached by a driver in a manner that allows the driver to fully handle and control the steering wheel. The transition mode is defined by movement of the steering column assembly 10 during transitioning of the assembly between the standard and autonomous driving modes. An electric actuator mechanism 12 at least partially retracts the steering column assembly 10 into the instrument cluster of the vehicle during the transition mode. When the driver wants to transition back to the standard driving mode, the ADAS is deactivated and the electric actuator mechanism 12 extends the steering column assembly 10 to an extended position that allows the driver to easily handle the steering wheel.

Extension and retraction of the steering column assembly 10 refers to translation of a retractable portion 16 of the steering column assembly 10. The retractable portion 16 includes one or more components that are translatable. For example, in addition to the aforementioned steering wheel and the steering shaft 14, a moveable portion 18, which may also be referred to as an upper jacket in some embodiments, is translatable relative to a stationary portion 20, which may be referred to as a lower jacket in some embodiments. Also shown is a mounting bracket 21 that couples the steering column assembly 10 to the vehicle.

The electric actuator mechanism 12 is operatively coupled to the moveable portion 18 and the stationary portion 20 of the steering column assembly 10. A translating assembly facilitates automated telescoping (i.e., translating) and raking (i.e., tilting) of the steering column assembly. Many different types of translating assemblies are contemplated, but the following embodiment is described for purposes of example only, as the embodiment is not intended to be limiting. In particular, a threaded rod 22, such as a ball screw, is operatively coupled to the stationary portion 20 with one or more brackets 24. A nut, such as a ball nut, is in threaded engagement with the threaded rod 22 for translation along the threaded rod 22. The threaded rod 22 and nut may be referred to herein as a translating assembly. As described in detail below, a plurality of additional components of the electric actuator mechanism 12 are operatively coupled to the nut and also translate along the threaded rod 22. In operation, the electric actuator mechanism 12 translates the moveable portion 18 relative to the stationary portion 20 to extend and retract the steering column assembly 10 in an electrically powered manner.

Figure 2:
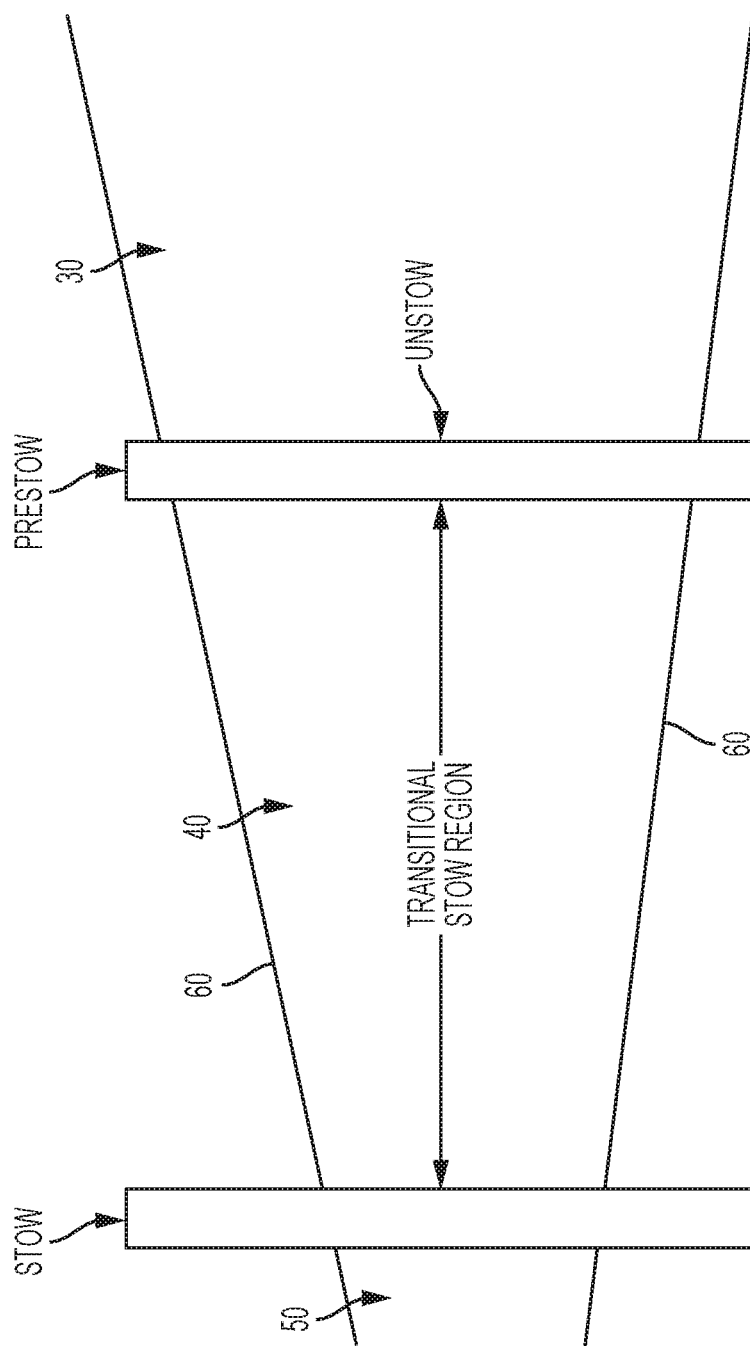
FIG. 2 is a diagram illustrating multiple regions associated with stowed and unstowed positions of the steering column assembly.

Referring now to FIG. 2, three discrete zones—or regions—associated with positioning of the steering column assembly 10 are illustrated. A first region may be referred to as an unstowed region and is generally referenced with numeral 30. The first region 30 defines boundaries of the telescope and rake positions where the driver may have full control of adjustability of the steering column assembly 10. In other words, the driver has full control of telescope and/or rake adjustment when the steering column assembly 10 is in the first region 30. Reference to the steering column assembly 10 being within the first region 30 refers to a specified portion or location of the steering column assembly 10 being within the first region 30. For example, the most rearward portion of the overall assembly, such as the steering input device (e.g., steering wheel) may be the reference point of the overall assembly that defines when the steering column assembly 10 is considered to be in the first region 30. However, alternative reference points of the steering column assembly 10 may be employed in some embodiments.

A second region may be referred to as a transitional region and is generally referenced with numeral 40. The second region 40 defines boundaries of the telescope and rake positions where the driver cannot manually move the steering column assembly 10 towards the instrument cluster (i.e., forward in vehicle). In other words, the driver has partial control of telescope and/or rake adjustment when the steering column assembly 10 is in the second region 40, since s/he may only adjust the steering column assembly 10 rearwardly away from the instrument cluster. Reference to the steering column assembly 10 being within the second region 40 refers to a specified portion or location of the steering column assembly 10 being within the second region 40. For example, the most rearward portion of the overall assembly, such as the steering input device (e.g., steering wheel) may be the reference point of the overall assembly that defines when the steering column assembly 10 is considered to be in the second region 40. However, as with the first region description, alternative reference points of the steering column assembly 10 may be employed in some embodiments.

A third region may be referred to as a stowed region and is generally referenced with numeral 50. The third region 50 defines boundaries of the telescope and rake positions where the driver cannot manually move the steering column assembly 10 in any direction. In other words, the driver has no control of telescope and/or rake adjustment when the steering column assembly 10 is in the third region 50. Reference to the steering column assembly 10 being within the third region 50 refers to a specified portion or location of the steering column assembly 10 being within the third region 50. For example, the most rearward portion of the overall assembly, such as the steering input device (e.g., steering wheel) may be the reference point of the overall assembly that defines when the steering column assembly 10 is considered to be in the third region 50. However, as with the first and second region descriptions, alternative reference points of the steering column assembly 10 may be employed in some embodiments.

As shown in FIG. 2, each region 30, 40, 50 defines a tapering of the rake position boundary of the steering column assembly 10. The rake position boundary is referenced with numeral 60. Positioning and travel along the telescope path during stowing or unstowing of the steering column assembly 10, driver restriction can be applied for safe operation and transition. The above-described restrictions, system response and/or region boundaries are configurable based on the particular application of use, thereby providing design flexibility.

Figure 3:
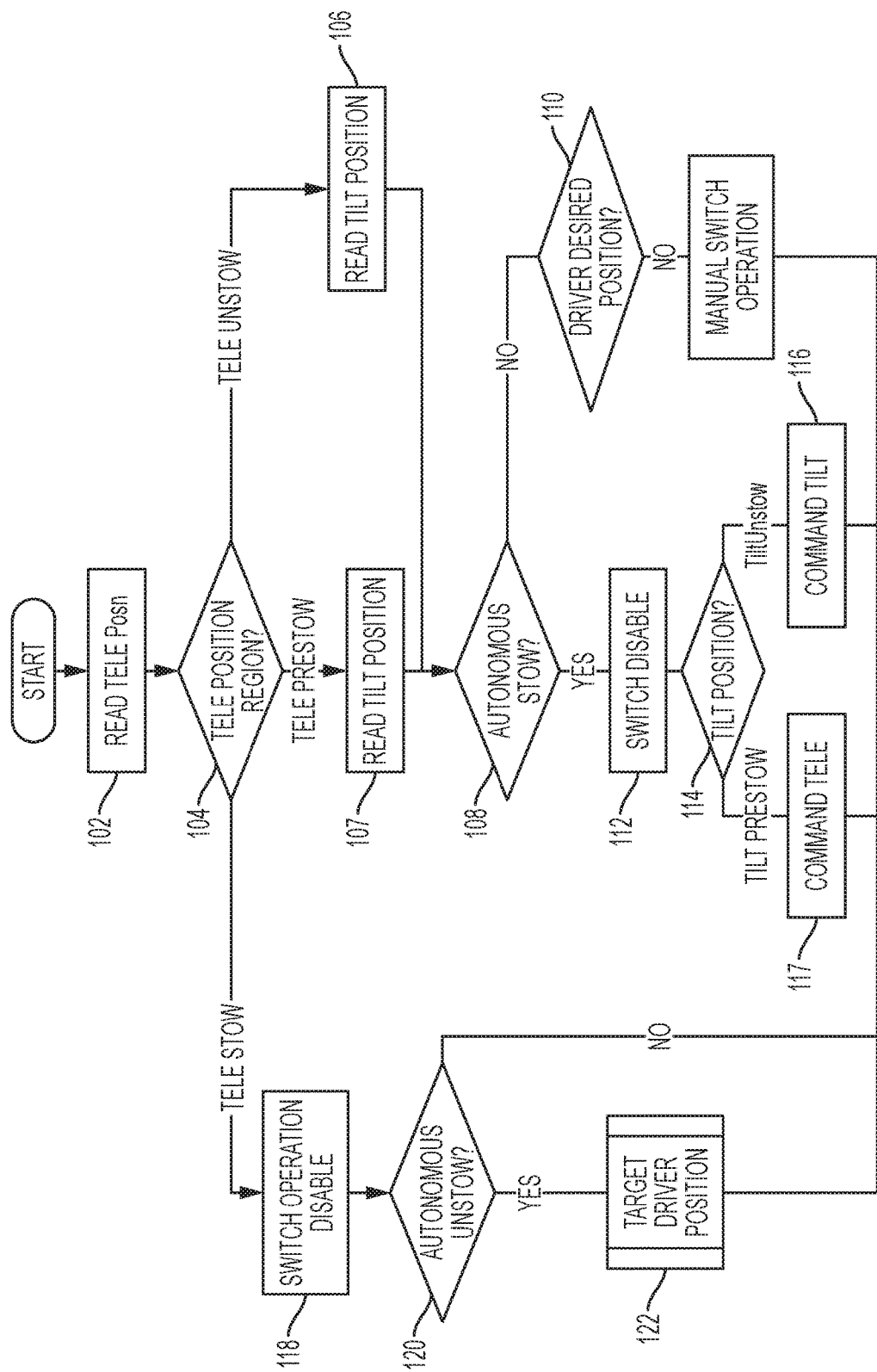
FIG. 3 is a flow diagram illustrating a method of monitoring the steering column assembly.

Referring to FIG. 3, illustrated is a sequence of operating conditions of the steering column assembly 10, showing a method of monitoring and/or operating the steering column assembly 10. Block 102 represents detection of the telescope position of the steering column assembly 10. Position detection may be facilitated with any suitable sensor or the like. The detected position allows identification of which region (i.e., first region 30, second region 40, third region 50) the steering column assembly 10 is positioned within at block 104. If the telescope position of the steering column assembly is within the first region 30, the system then detects the rake position of the steering column assembly at block 106. Similarly, if the telescope position of the steering column assembly is within the second region 40, the system then detects the rake position of the steering column assembly at block 107. The system then determines if the steering column assembly is undergoing a stowing transition at block 108. If the steering column assembly is not undergoing a stowing transition, the system allows manual switch operation by the driver at block 110—partial manual operation if in the second region 40 and full manual operation if in the first region, as described above in detail. If the steering column assembly is undergoing a stowing transition, the system disables the manual control ability of the driver at block 112. The system then monitors the rake position of the steering column assembly at block 114 to ensure that the steering column assembly rake position is maintained within the appropriate rake position boundary 60 (FIG. 2). The tilt position is commanded if in the unstow region at block 116 and the telescope position is commanded if in the second, transition region at block 117.

Referencing back to block 104 where the telescope position region is determined, if the steering column assembly 10 is located within the third (i.e., stowed) region, manual adjustment capability is disabled completely at block 118. The system then determines if the steering column assembly is undergoing an unstowing transition at block 120. If the steering column assembly is not undergoing an unstowing transition, the system remains in the same state. If the steering column assembly is undergoing a stowing transition, the system targets a preferred driver position of the steering column assembly during the unstowing process at block 122.

Although the system and method described above include three discrete regions that the steering column assembly 10 is moveable within, it is to be understood that more or fewer regions may be included in some embodiments. For example, only two regions may be provided, with one region allowing full or partial manual adjustment capability for a driver, while the other region may allow no or partial manual adjustment capability. Similarly, more zones may be provided, each with different manual adjustment capability restrictions.

The embodiments described herein facilitates safe, reliable and automatic stowing and unstowing of the steering column assembly 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit

Having thus described the invention, it is claimed:

1. A retractable steering column assembly comprising:
   a retractable portion; and
   an electric actuator mechanism for translating and tilting the retractable portion throughout a plurality of regions, each of the regions defining distinct manual adjustment restrictions and tilt position boundaries of the retractable steering column assembly,
   wherein the plurality of regions comprises a first region, a second region and a third region, the first region located further from an instrument cluster than the distance between the second region and the instrument cluster, the second region located further from an instrument cluster than the distance between the third region and the instrument cluster, positioning of the retractable portion in the first region allowing full manual adjustment of the retractable portion, positioning of the retractable portion in the second region allowing partial manual adjustment of the retractable portion, positioning of the retractable portion in the third region allowing no manual adjustment of the retractable portion,
   wherein manual adjustment of the retractable portion away from the instrument cluster is permitted when the retractable portion is in the second region, manual adjustment of the retractable portion toward the instrument cluster not permitted when the retractable portion is in the second region.

2. The retractable steering column assembly of claim 1, wherein the tilt position boundaries comprise a first tilt position boundary in the first region, a second tilt position boundary in the second region, and a third tilt position boundary in the third region, the second tilt position boundary narrower than the first position boundary, the third tilt position boundary narrower than the second tilt position boundary.

3. The retractable steering column assembly of claim 1, wherein the retractable portion is an upper jacket of the steering column assembly.

4. A method of controlling adjustment of a steering column assembly comprising:
   detecting a telescope position of the steering column assembly, wherein detecting the telescope position comprises detecting a position of a portion of a retractable portion of the steering column assembly;
   determining which one of a plurality of regions the telescope position is within; and
   defining a manual adjustment restriction based on which of the plurality of regions the telescope position is within, wherein the plurality of regions comprises a first region defining a first manual adjustment restriction, a second region defining a second manual adjustment restriction, and a third region defining a third manual adjustment restriction, the first region located further from an instrument cluster than the distance between the second region and the instrument cluster, the second region located further from an instrument cluster than the distance between the third region and the instrument cluster, wherein positioning of the retractable portion in the first region allows full manual adjustment of the retractable portion, positioning of the retractable portion in the second region allows partial manual adjustment of the retractable portion, positioning of the retractable portion in the third region allows no manual adjustment of the retractable portion.

5. The method of claim 4, wherein the manual adjustment restriction defined for each of the plurality of regions are distinct from each other.

6. The method of claim 4, wherein the second manual adjustment restriction within the second region comprises permitting manual adjustment of the retractable portion away from the instrument cluster and not permitting manual adjustment of the retractable portion toward the instrument cluster.

7. The method of claim 4, further comprising determining whether the retractable portion is being automatically retracted while the retractable portion is in the first region and the second region.

8. The method of claim 7, further comprising disabling manual adjustment capability if the retractable portion is being automatically retracted.

9. The method of claim 7, further comprising determining whether the retractable portion is being automatically extended while the retractable portion is in the third region.

10. The method of claim 9, further comprising automatically adjusting the retractable portion to a driver desired position if the retractable portion is being automatically extended.

* * * * *